(12) United States Patent
Izawa

(10) Patent No.: US 7,550,228 B2
(45) Date of Patent: Jun. 23, 2009

(54) CAR POWER SOURCE BATTERY APPARATUS

(75) Inventor: Ryosaku Izawa, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 928 days.

(21) Appl. No.: 11/186,981

(22) Filed: Jul. 22, 2005

(65) Prior Publication Data

US 2006/0028170 A1 Feb. 9, 2006

(30) Foreign Application Priority Data

Jul. 22, 2004 (JP) ............................. 2004-214928

(51) Int. Cl.
*H01M 6/42* (2006.01)
(52) U.S. Cl. ........................ 429/160; 429/149; 429/157; 429/151; 429/158
(58) Field of Classification Search ........................ None
See application file for complete search history.

(56) References Cited

U.S. PATENT DOCUMENTS 7,160,643 B2 * 1/2007 Kunimoto et al. ............. 429/97

FOREIGN PATENT DOCUMENTS

JP 10-270006 10/1998

* cited by examiner

*Primary Examiner*—Patrick Ryan
*Assistant Examiner*—Cynthia Lee
(74) *Attorney, Agent, or Firm*—Wenderoth, Lind & Ponack, L.L.P.

(57) ABSTRACT

The car power source battery apparatus houses a plurality of battery modules in a holder case. Battery modules have batteries connected in a straight-line fashion, and boundary regions between batteries are covered with elastomer cylinders, which can flexibly deform. The outline of elastomer cylinder regions of a battery module is wider than the outline of battery regions not covered by elastomer cylinders. The holder case is divided into a first holder and a second holder to form holding compartments to retain battery modules. The inside shape of a holding compartment is a cylinder shape which is narrower than the outline of elastomer cylinder regions and wider than the outline of battery regions. Elastomer cylinder regions are resiliently compressed by holding compartment inside surfaces to hold battery modules, and cooling gaps are established between battery regions and holding compartment inside surfaces.

15 Claims, 13 Drawing Sheets

CAR POWER SOURCE BATTERY APPARATUS

BACKGROUND OF THE INVENTION

This invention relates primarily to a car power source battery apparatus used as a power source for a motor that drives an automobile, such as a hybrid car or electric automobile.

A car power source battery apparatus used as a power source for an automobile driving motor connects many batteries in series to increase output voltage. This is for the purpose of increasing output of the driving motor. In a battery apparatus used for this type of application, a large number of batteries are housed within the apparatus to produce a large output voltage. This type of battery apparatus is cited, for example, in Japanese Patent Application Disclosure HEI 10-270006 (1998). As shown in the exploded oblique view of FIG. 1, the power source apparatus cited in this disclosure is provided with a holder case 52 which houses battery modules in a plurality of rows. The holder case 52 is formed from plastic in the shape of a rectangular box with an open top. Circular openings 53*a* are provided in both end planes 53 of the holder case 52 for insertion of long narrow, circular cylindrical battery modules. Further, to hold and stabilize battery modules, intermediate planes 54 are provided parallel to the end planes 53, and circular openings 54*a* are also established in those intermediate planes 54. Battery modules are inserted through the openings 53*a* in the end planes 53 and through the openings 54*a* in the intermediate planes 54 to retain the battery modules in specified positions in the holder case 52.

Since a large number of battery modules are Inserted through openings and held in a holder case of this configuration, it has the drawback that the apparatus is difficult to manufacture and cost of manufacture is high. This is because openings for insertion and retention of battery modules are formed in both end planes and Intermediate planes. Molding a holder case provided with openings In both end planes and intermediate planes requires a mold with a complex structure. This is because regions, which form openings in both end planes and intermediate planes, cannot be easily removed from the mold.

Further, in a holder case of this configuration, it is necessary to form the openings provided in both end planes and intermediate planes exactly the same shape as the external shape of the battery modules. This is because battery modules cannot be retained without gaps if the openings are larger than the battery modules, and battery modules cannot be inserted in the openings if they are smaller than the battery modules. The problem is that it is difficult to manufacture battery modules having an extremely precise outside diameter. There is some degree of error in the outside diameter of circular cylindrical batteries manufactured in quantity, Consequently, even if openings in both end planes and intermediate planes are accurately formed, it is difficult to insert, without forming gaps, and firmly retain all battery modules in those openings. This is because the outside diameters of the battery modules are different.

To hold battery modules, which have outside diameter variation, openings must be formed with a size that allows insertion of battery modules having the largest outside diameter. Therefore, when a battery module having a slightly small outside diameter is inserted through the openings, gaps are formed between the battery module and the openings. If gaps are formed, the apparatus has the drawback that both end planes and intermediate planes cannot stably retain the battery module without movement.

Still a further problem with a holder case, which has openings the same size as battery module outside diameter, is the extreme amount of trouble required to insert and set the battery modules. This is because snug insertion of battery modules through small openings without forming gaps cannot be performed in a smooth fashion. Therefore, insertion of a large number of battery modules to assemble a holder case is extremely labor intensive, and assembly cost becomes high. This has the drawback that, in combination with the high cost of holder case manufacture, the total cost of the battery apparatus becomes remarkably high.

A holder case with the structure shown In FIG. 2 was developed with the object of eliminating these drawbacks (Japanese Patent Application Disclosure 2000-223096, (2000)).

SUMMARY OF THE INVENTION

In the holder case 62 cited in the disclosure above, a plurality of battery modules 61 are held in parallel disposition. The holder case 62 is provided with cover cases 62A disposed on both sides, and an intermediate case 62B disposed between the cover cases 62A. Further, the holder case 62 is provided with holder ribs 65, to arrange and hold battery modules 61 in specified positions in a plurality of rows. Holder ribs 65 project out from both sides of the intermediate case 62B and from the inside surfaces of the cover cases 62A. In this holder case 62, the cover cases 62A on both sides and the intermediate case 62B join together to sandwich and hold battery modules 61. The battery modules 61 are arranged and held in specified positions in a plurality of rows via the holder ribs 65, which are provided on the cover cases 62A and intermediate case 62B.

Holder ribs 65 in this holder case 62 retain battery modules 61 via shock-absorbing gaskets 66. As shown in FIG. 3, shock-absorbing gaskets 66 are formed in a shape that conforms to the shape of the holder ribs 65. Battery modules 61 are disposed between opposing concave regions of the shock-absorbing gaskets 66, and they are sandwiched and held tightly in position. In a holder case 62 with shock-absorbing gaskets 66 on the holder ribs 65, the shock-absorbing gaskets 66 absorb vibration and protect the battery modules 61 from vibration.

In this configuration of holder case, holder ribs projecting from inside surfaces apply local pressure to battery module surfaces to hold the battery modules. Therefore, It is difficult to house large, heavy battery modules, which are not connected in ideal straight-line fashion, while firmly holding them in optimal conditions. Battery modules are not always joined together in completely straight lines. Battery module connection regions may be slightly bent or have an offset from the centerline. When battery modules with these aberrant shapes are supported and held in place by holder ribs, excessive force is locally applied to contact points between battery modules and holder ribs. Further, it is difficult to sandwich a battery module between holder ribs and hold it in a stable and reliable fashion if the battery module is bent or has offsets from its centerline. For this reason, in actual on-board car installation, defects such as battery module warp can result from vibration of the holder case.

The present invention was developed with the object of resolving drawbacks described above. Thus it is a primary object of the present invention to provide a car power source battery apparatus that can firmly retain battery modules in a holder case, and can reduce battery module warp due to vibration. Another important object of the present invention is to provide a car power source battery apparatus that can reliably hold battery-connecting regions that cannot be made sufficiently strong. Still another important object of the present invention is to provide a car power source battery apparatus that is easily assembled, does not require ribs projecting from inner surfaces of a holding compartment to support battery modules, and can provide cooling gaps for battery modules retained in a holding compartment.

The car power source battery apparatus of the present invention houses battery modules 1 in a holder case 2. A battery module 1 is a plurality of batteries 10 connected in a straight-line fashion. A battery module 1 connects batteries 10 in series, and in a straight-line fashion, either with or without connecting pieces 20. The boundary region between connected batteries 10 is covered by a flexibly deforming cylindrical element, which is a elastomer cylinder 3. This elastomer cylinder 3 laminates the surfaces of both end regions of adjacent batteries 10, and its center region closes off the connection gap 8 at the boundary between batteries 10. A battery module 1 provided with elastomer cylinders 3 over battery connecting regions has a wider outline at elastomer cylinders 3 than at battery regions 5 uncovered by elastomer cylinders 3. The holder case 2 has holding compartments 4 to house battery modules 1, and is divided into a first holder 2A and a second holder 2B that sandwich and hold battery modules 1 disposed in the holding compartments 4. The shape of the interior of a holding compartment 4 formed by the first and second holders 2A, 2B is cylindrical, narrower than the outline of elastomer cylinders 3, and wider than the outline of battery regions 5 between elastomer cylinders 3. In this car power source battery apparatus, battery modules 1 are disposed in cylindrically shaped holding compartments 4, first and second holders 2A, 2B are joined together, elastomer cylinder regions are resiliently sandwiched by the inside surfaces of holding compartments 4 to hold the battery modules 1 in those holding compartments 4, and cooling gaps 6 are established between battery regions 5 and inside surfaces of holding compartments 4.

The car power source battery apparatus described above has the characteristic that battery modules are firmly held inside the holder case, and battery module warp and deformation due to vibration can be reduced. This is because battery modules are provided with elastomer cylinders as cylindrical elements at battery boundaries, holder case holding compartments that house the battery modules are shaped as cylinders, elastomer cylinders are resiliently sandwiched and held by the inside surfaces of holding compartments, and as a result of elastomer cylinder thickness, cooing gaps are established between battery regions and the inside surfaces of holding compartments. In particular, since elastomer cylinders are provided at boundaries where batteries are connected together and elastomer cylinders are sandwiched by the inside surfaces of holding compartments to retain the battery modules in those holding compartments, this configuration has the characteristic that battery connection regions, which do not have sufficient strength, can be firmly retained via the elastomer cylinder. Further, since elastomer cylinders retain battery connection regions in a flexibly deforming fashion, easily bent battery connection regions are supported in an ideal fashion and not subjected to abnormal forces. Therefore, the car power source battery apparatus of the present invention also realizes the characteristic that battery connection regions, which cannot be made with sufficient strength, can be held firmly.

Still further characteristics are realized as follows. Assembly is made simple. Ribs projecting from Inside surfaces of holding compartments to support battery modules, as in prior art configurations, are unnecessary. A holder case is used, which is formed in an extremely simple shape. Furthermore, cooling gaps can be established by housing the battery modules in the holding compartments.

In the car power source battery apparatus of the present invention, batteries 10 can be circular cylindrical batteries, holding compartments 4 can be circular cylindrical in shape, inside diameter of holding compartments 4 can be smaller than the outside diameter of battery module 1 elastomer cylinders, and inside diameter of holding compartments 4 can be larger than the outside diameter of battery regions 5.

In the car power source battery apparatus of the present invention, elastomer cylinders 3 and battery 10 surfaces can be covered by an external laminate.

In the car power source battery apparatus of the present invention, cooling orifices 7 connected to the cooling gaps 6 can be provided through the holder case 2, and battery modules 1 can be cooled by forced ventilation from the cooling orifices 7 into the cooling gaps 6.

Finally, in the car power source battery apparatus of the present invention, ridges 30 can be provided on the surfaces of elastomer cylinders 3.

The above and further objects and features of the invention will more fully be apparent from the following detailed description with accompanying drawings.

DETAILED DESCRIPTION OF THE INVENTION

Figure 1:
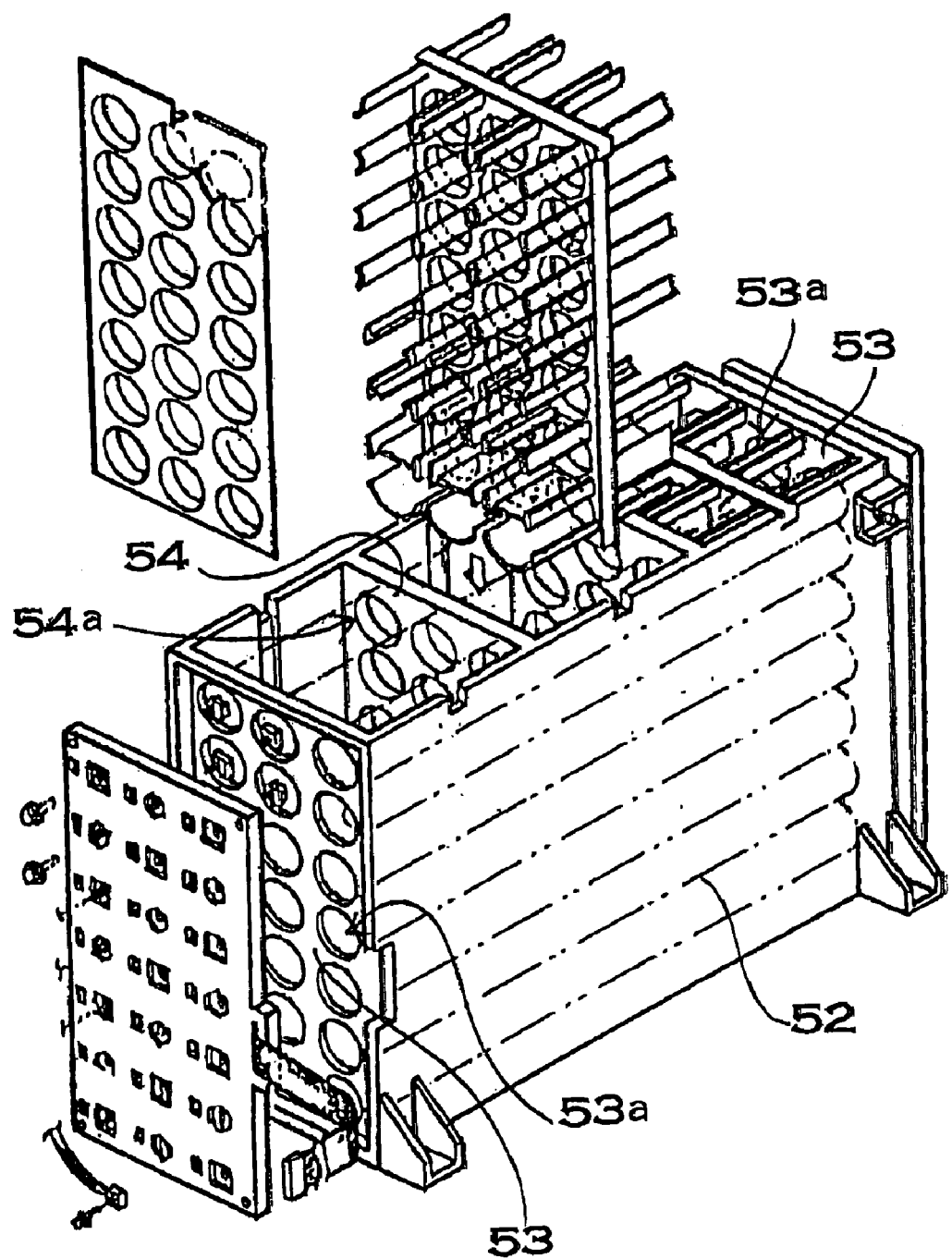
FIG. 1 is an exploded oblique view showing an example of a prior art power source apparatus.
Figure 2:
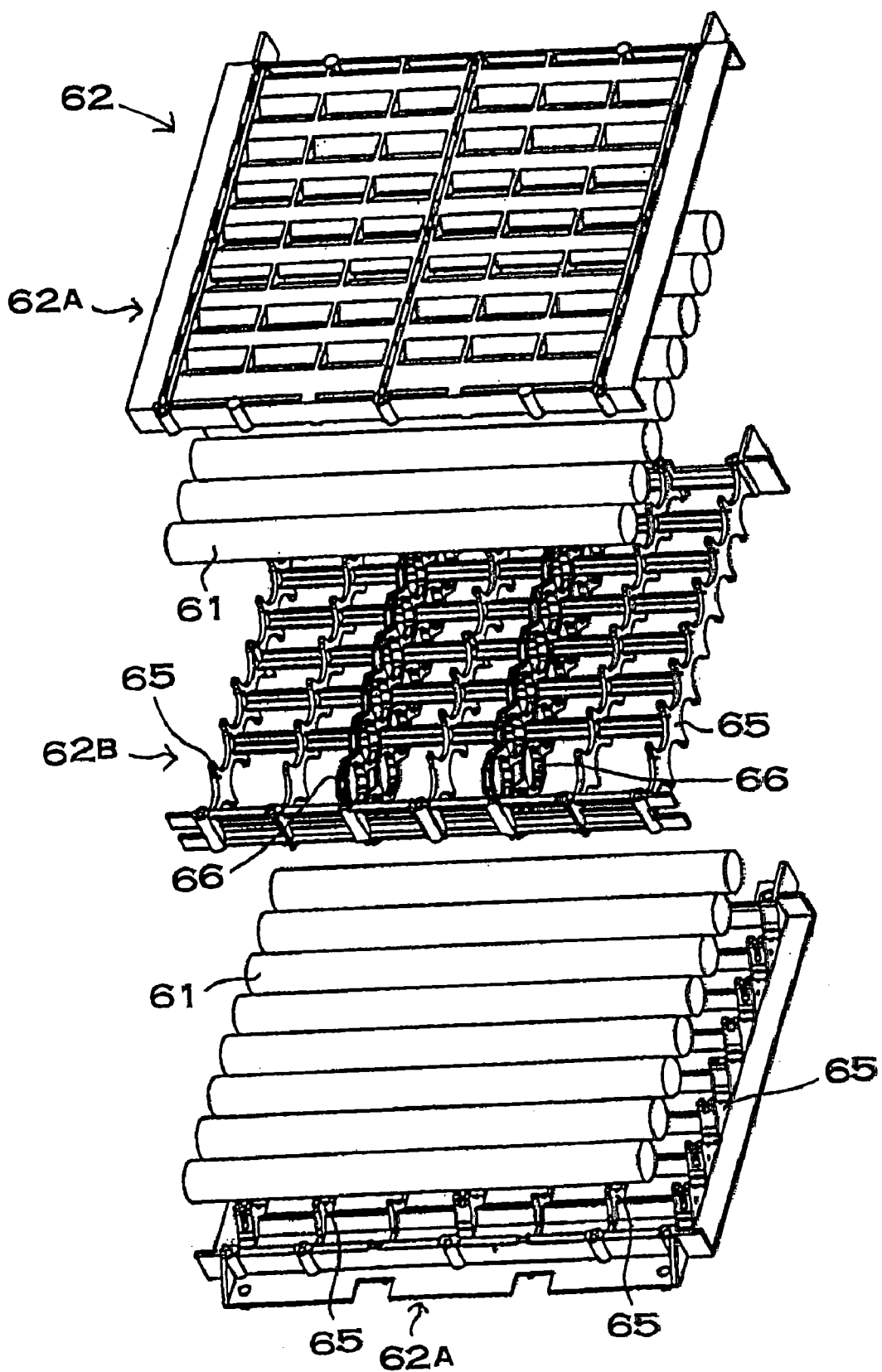
FIG. 2 is an exploded oblique view showing another example of a prior art power source apparatus.
Figure 3:
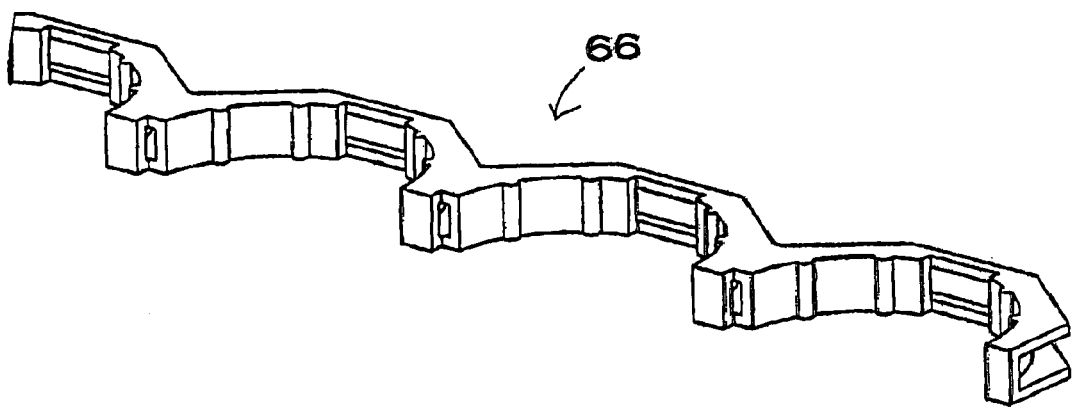
FIG. 3 is an enlarged oblique view of shock-absorbing gaskets disposed in the holder case of the power source apparatus shown in FIG. 2.
Figure 4:
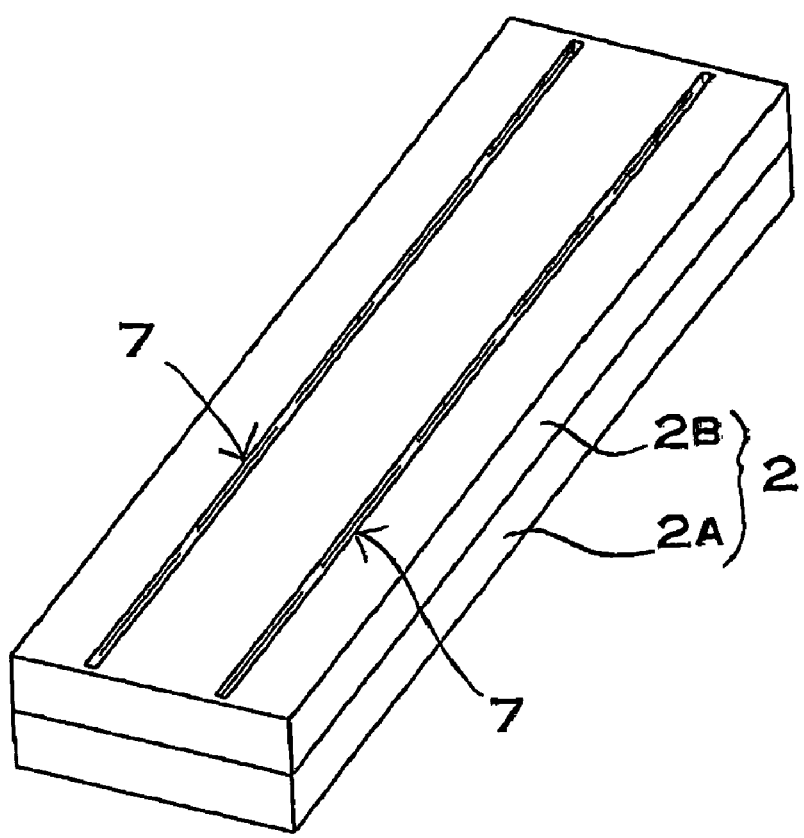
FIG. 4 is an oblique view of an embodiment of the car power source battery apparatus of the present invention.

The car power source battery apparatus shown in FIGS. 4-8 has a plurality of battery modules 1 housed in a holder case 2. FIGS. 4-7 show, as an example, a holder case 2 configured to house two battery modules 2. A large number of battery modules can be housed in a holder case of similar structure. In an actual car power source battery apparatus, several tens of battery modules are housed in a holder case and connected in series to increase output voltage. The output voltage of a battery apparatus is adjusted by the number of battery modules connected in series. A high output battery apparatus has a large number of battery modules connected in series. For example, a hybrid car may have fifty battery modules connected in series. However, the number of battery modules connected in series can also be greater than fifty or less than fifty. The number of battery modules connected in series is preferably the number that makes the battery apparatus output voltage 200V to 400V. However, output voltage of the battery apparatus depends on the requirement of the automobile and can also be less than 200V or greater than 400V.

Battery modules 1 of the figures have circular cylindrical batteries connected in series and joined in a straight-line fashion. However, the battery apparatus of the present invention is not limited to circular cylindrical batteries and may also connect rectangular batteries in series to form battery modules. Battery module 1 batteries 10 are nickel hydrogen batteries. However, battery modules may also use rechargeable batteries such as nickel cadmium batteries or lithium ion rechargeable batteries.

The plurality of battery modules 1 housed in the holder case 2 are connected in series via bus bars (not illustrated). Bus bars connect with output terminals (not illustrated) provided at both ends of the battery modules 1 to connect adjacent battery modules 1 in series.

Figure 9:
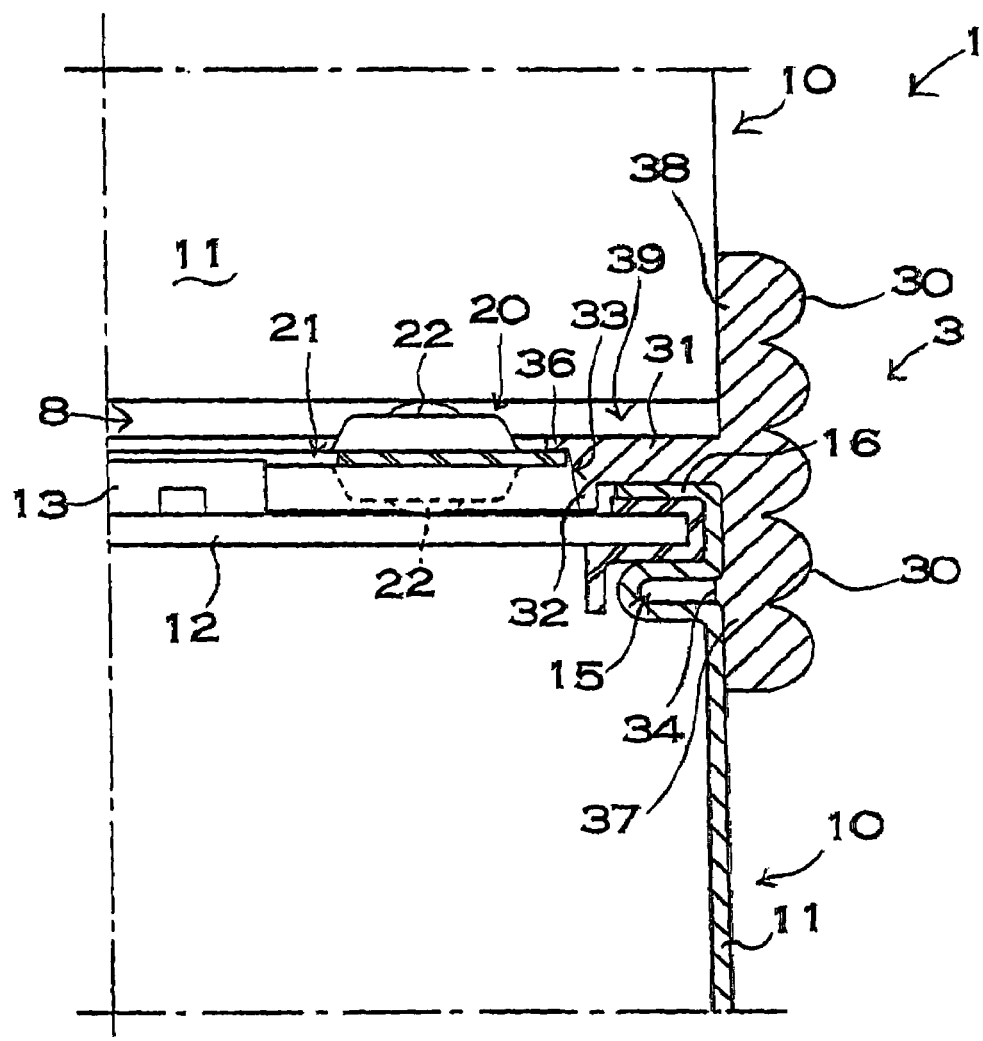
FIG. 9 is a cross-section view showing one example of battery module batteries connected with an elastomer cylinder.

Battery modules 1 have battery 10 end regions welded together to join the batteries 10 in a straight-line fashion. FIGS. 9 and 12 are cross-section views of battery 10 connection regions of battery modules 1. Battery modules 1 shown in these and other figures have connecting pieces 20 welded to opposing battery 10 end planes to connect batteries 10 in series and in a straight-line fashion. Connecting pieces 20 are shown in FIGS. 9-17. Although batteries 10 of the battery modules 1 in FIGS. 9 and 12 are connected via connecting pieces 20, metal plates at battery end planes can also be directly welded together to connect batteries in series and in a straight-line fashion without using connecting pieces. Batteries connected in series and in a straight-line fashion without using connecting pieces are provided with welding projections at one or both battery end planes, and batteries are connected by welding those welding projections.

Connecting pieces 20 are fabricated by press-forming sheet metal. For connecting pieces 20, sheet metal starting material, such as iron sheet metal, is plated on both sides with metal plating layers. The plated layers are a conducting layer that has excellent conductivity and low resistance, and a resistive layer plated on top of the conducting layer that has resistance suitable for welding. The conducting layer is copper, silver, or an alloy of those and other metals, and has electrical resistance lower than either the sheet metal starting material or the resistive plated layer. The resistive layer is nickel, chrome, or an alloy of those, and has higher resistance than the conducting plated layer. In these connecting pieces 20, the resistive plated layer produces heat easily and is quickly welded to battery end planes. In addition, the conducting plated layer has low electrical resistance and allows rechargeable batteries 10 to be connected in series in a low resistance manner.

Connecting pieces 20 are weld-connected to battery 10 end planes, which are disposed in opposition, to connect batteries 10 in series and in a straight-line fashion. A connecting piece 20 is ring-shaped sheet metal with a center hole 21 and provided with a plurality of welding projections 22 jutting out from both sides for welding to battery 10 end planes. Welding projections 22 are welded to opposing battery 10 end planes to connect adjacent batteries 10 in series and in a straight-line fashion. The projecting electrode 13 of a battery 10 is inserted into the center hole 21. A connecting piece can also be made without a center hole, and can be shaped with a projecting region to mate with a projecting electrode.

Figure 10:
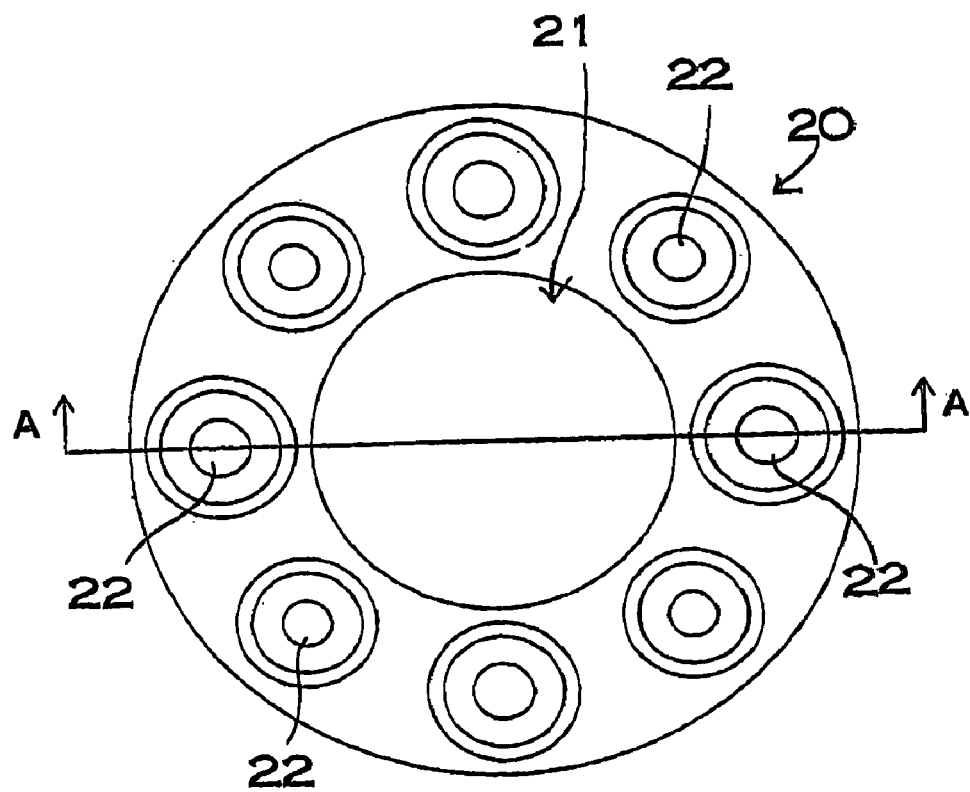
FIG. 10 is a plan view of the connecting piece shown in FIG. 9.
Figure 11:
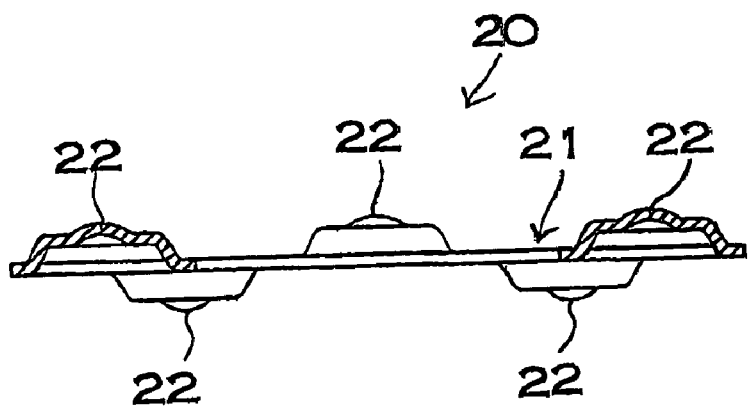
FIG. 11 is a cross-section view through the line A-A of the connecting piece shown in FIG. 10.
Figure 12:
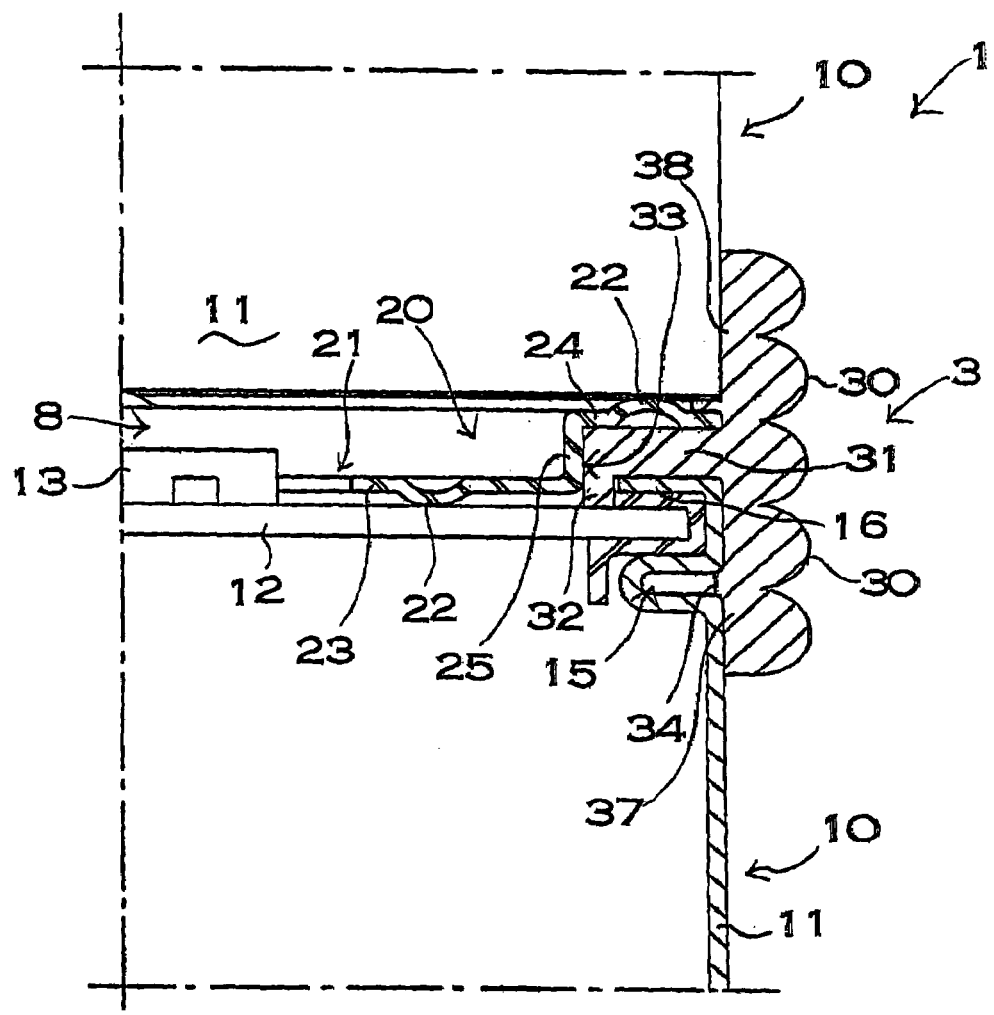
FIG. 12 is a cross-section view showing another example of battery module batteries connected with an elastomer cylinder.

The connecting piece 20 shown In FIGS. 9-11 has an outside diameter smaller than the inside diameter of the crimped rim 16 provided around the periphery of a battery end plane. A gap is established between the outer periphery of the connecting piece 20 and the crimped rim 16 to prevent short circuit due to the connecting piece 20 touching the crimped rim 16. Since the connecting piece 20 can touch and short circuit with the crimped rim 16 if the position of the connecting piece 20 shifts, the connecting piece 20 is held in a fixed position by an outer ring 39 formed as a single piece with the elastomer cylinder 3. An outer ring can also be formed of insulating material, such as plastic, separately from the elastomer cylinder, and disposed inside the elastomer cylinder. The connecting piece 20 of FIGS. 10 and 11 is provided with a plurality of welding projections 22 at the same circumference. Welding projections 22 project alternately from opposite sides of the connecting piece 20, and project up and down in FIG. 11. Welding projections 22 jutting out from opposite sides of the connecting piece 20 are weld-connected to opposing battery 10 end planes.

Figure 13:
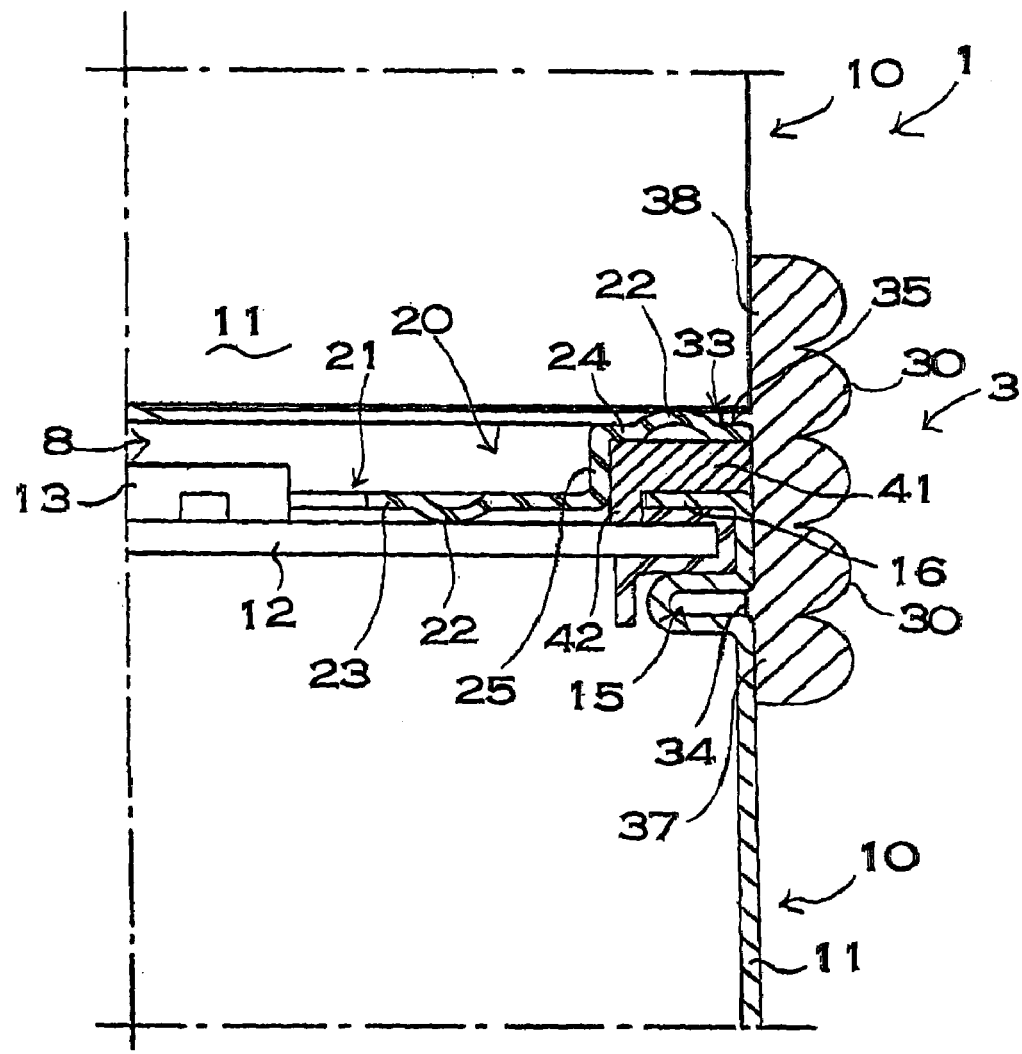
FIG. 13 is a cross-section view showing another example of battery module batteries connected with an elastomer cylinder.
Figure 14:
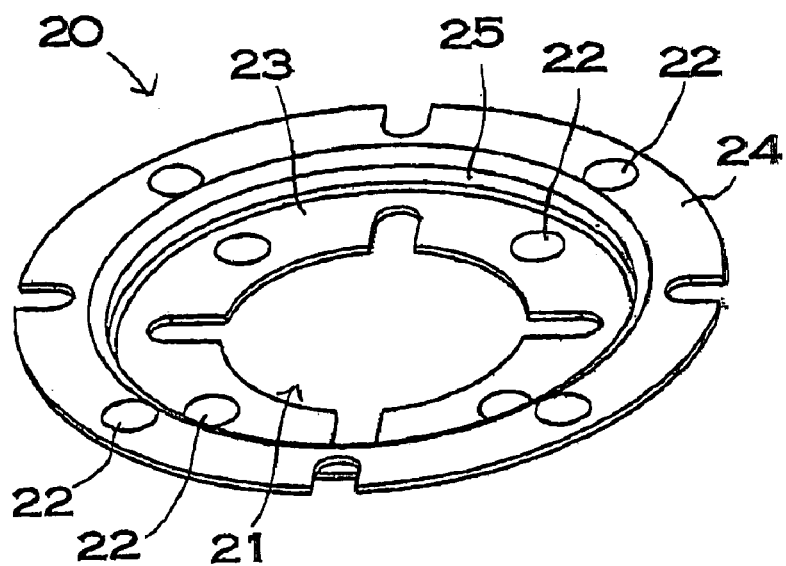
FIG. 14 is an oblique view of the connecting piece shown in FIG. 12.
Figure 15:
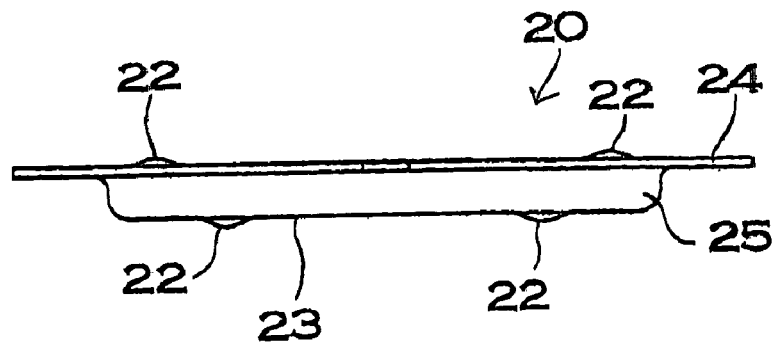
FIG. 15 is a front view of the connecting piece shown in FIG. 14.
Figure 16:
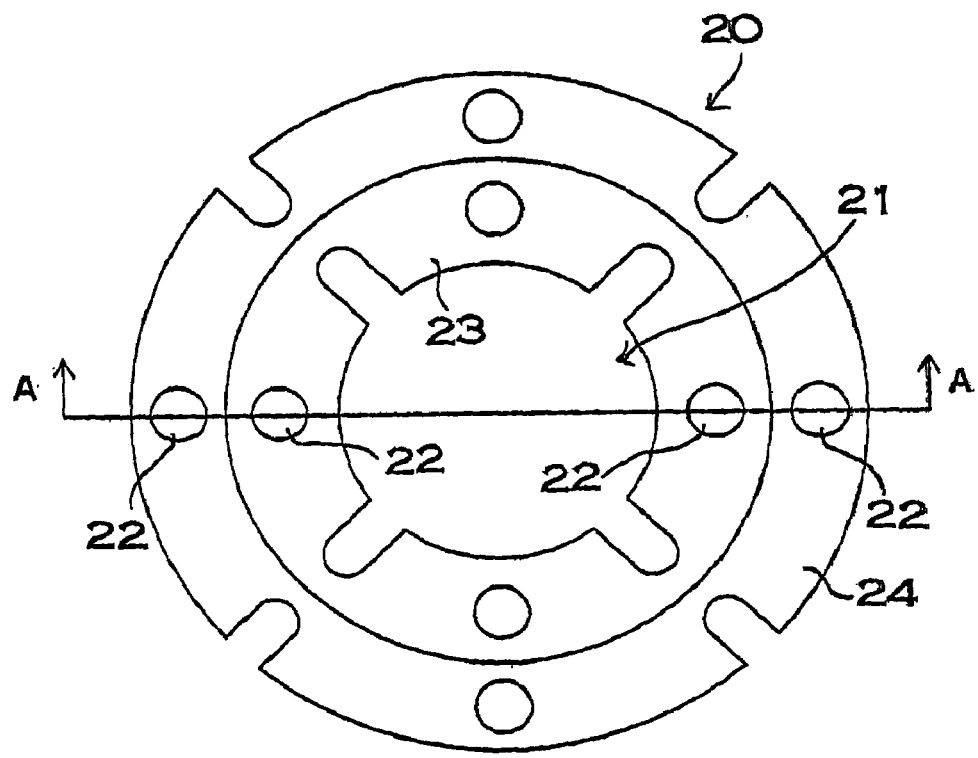
FIG. 16 is a plan view of the connecting piece shown in FIG. 14.
Figure 17:
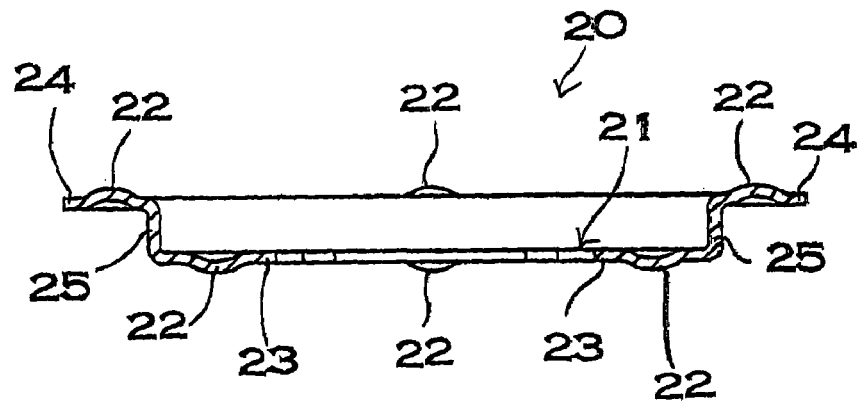
FIG. 17 is a cross-section view through the line A-A of the connecting piece shown In FIG. 16.

The connecting piece 20 of FIGS. 12-17 has an outside diameter larger than the inside diameter of the crimped rim 16 provided at a battery 10 end plane. This connecting piece 20 has an outside diameter essentially equal to the outside diameter of a battery 10. In the battery modules 1 shown in FIGS. 12 and 13, insulating rings 31, 41 are disposed between the connecting piece 20 and the crimped rim 16 to prevent the connecting piece 20 from touching and short circuiting with the crimped rim 16. As shown in FIG. 12, an insulating ring 31 is formed as a single piece with the elastomer cylinder 3, or as shown in FIG. 13, an insulating ring 41 is formed separately from the elastomer cylinder 3 in a ring shape from a rubber-like flexible insulating material such as plastic. An insulating ring 41 formed separately from the elastomer cylinder 3 has an outside diameter essentially equal to the outside diameter of a battery 10. Further, the insulating rings 31, 41 of FIGS. 12 and 13 are provided with ring flanges 32, 42 on their inside edges to cover the inside surfaces of crimped rims 16. Ring flanges 32, 42 are formed as single pieces with the insulating rings 31, 41. Ring flanges 32, 42 are shaped to insert inside the crimped rims 16. The ring flange 42 of the insulating ring 41 fits interior to the crimped rim 16 and disposes the insulating ring 41 in a fixed position.

The connecting piece 20 of FIGS. 12-17 is press-formed from sheet metal in a shape that has a level difference between the inner region 23 and outer periphery region 24, The inner region 23 is disposed in close proximity to a sealing plate 12, which Is the end plane of one of the batteries 10, and the outer region 24 is insulated from the crimped rim 16 via the insulating ring 41 and is disposed in close proximity to the bottom of an external case 11, which is the end plane of the other battery 10. A plurality of welding projections 22 are provided on the inner region 23 and outer region 24 of the connecting piece 20 for welding each region. Welding projections 22 on the inner region 23 project towards the end plane sealing plate 12 for welding to the sealing plate 12. Welding projections 22 on the outer region 24 project towards the bottom of an external case 11, which is the battery end plane, for welding to the bottom of the external case 11. Welding projections 22 of the inner region 23 and outer region 24 are welded to opposing batteries 10 to connect the batteries 10 in series and in a straight-line fashion.

In a battery module 1, boundary regions of connected batteries 10 are covered with a flexibly deforming cylindrical elements, which are elastomer cylinders 3 that cover battery 10 connection gaps 8. Elastomer is a polymer material that displays rubber-like flexibility at room temperature. An elastomer cylinder 3 is produced by forming urethane or silicone, for example, into a circular cylinder, or by forming synthetic rubber or soft synthetic resin, which display rubber-like flexibility at room temperature, into a circular cylinder. However, an elastomer cylinder that covers a connection gap of a rectangular battery, is formed as a rectangular cylinder. An elastomer cylinder 3 is formed from an elastomer that has a degree of pliability, which allows it to flexibly deform when sandwiched inside the holder case 2.

As shown in the cross-section views of FIGS. 9, 12, and 13, elastomer cylinders 3 form layers over the surfaces of batteries 10 with adjacent end regions, and elastomer cylinder 3 center regions cover battery 10 boundary region gaps. Elastomer cylinders 3 are disposed between adjacent batteries 10 connected in a straight-line, and are attached to the batteries 10 in a manner that closes off the gap between adjacent batteries 10. An elastomer cylinder 3 has a first cylindrical region 37 that mates with the battery 10 end region on one side, a second cylindrical region 38 that mates with the battery 10 end region on the other side, and the first and second cylindrical regions 37, 38 are disposed in a straight-line configuration. End regions of two adjacent batteries 10 are inserted in the first and second cylindrical regions 37, 38 for straight-line connection with the elastomer cylinder 3.

The first and second cylindrical regions 37, 38 are formed in cylindrical shapes that allow insertion of battery 10 external case 11 end regions without gaps. First and second cylindrical regions 37, 38, which accept circular cylindrical battery 10 insertion, have circular cylindrical shapes, and their inside diameter is approximately equal to the outside diameter of the circular cylindrical batteries. More accurately, first and second cylindrical region 37, 38 inside diameter is very slightly smaller than the outside diameter of the circular cylindrical batteries. Slightly smaller first and second cylindrical regions 37, 38 are elastomer, which stretches with battery 10 insertion to tightly fit over battery 10 external cases 11 without gaps. In addition, there is a slight amount of variation in battery 10 external case outside diameter due to processing. First and second cylindrical regions 37, 38, which are slightly smaller than design dimensions of an external case made with outside diameter variation, can accept battery insertion, and in particular narrow battery insertion, without forming gaps. This Is because elastomer of the first and second cylindrical regions 37, 38 flexes to absorb external case 11 outside diameter variation.

The first cylindrical region 37 accepts insertion of a battery 10 end region that has a perimeter groove 15. This first cylindrical region 37 is provided with alignment projections 34 that project from the inside surface. Alignment projections 34 insert into the perimeter groove 15 of a battery 10 end region and make it difficult for the elastomer cylinder 3 to come off the battery 10. Elastomer cylinders 3 of the figures have alignment projections 34 that form a ridge projecting from the Inside surface of the first cylindrical region 37. It is not always necessary to form the alignment projections as projecting ridges. Alignment projections can also be made as locally projecting regions corresponding to battery perimeter groove position.

If the height of alignment projections 34 is too high, battery 10 end regions will not be able to smoothly insert into the first cylindrical region 37. If alignment projection 34 height is too low, an inserted battery 10 will easily come out of the first cylindrical region 37. Consequently, alignment projection 34 height is designed to smoothly accept battery 10 insertion while making it difficult to remove the battery 10.

In addition, the elastomer cylinders 3 of FIGS. 9 and 12 are provided with insulating rings 31, which hold connecting pieces 20 in fixed positions and insulate them from the crimped rim 16. The insulating ring 31 is disposed between the first and second cylindrical regions 37, 38. The connecting piece 20 is disposed inside the insulating ring 31, and the insulating ring 31 is provided with through holes 33 for welding opposing battery end planes. An elastomer cylinder 3, formed as a single piece comprising the first and second cylindrical regions 37, 38 and insulating ring 31 does not require separate fabrication and position alignment of an insulating ring.

In the elastomer cylinders 3 of FIGS. 9 and 12, crimped rim 16 surfaces including the inside surface are covered by insulating rings 31. To insulate the inside surface of a crimped rim 16, a ring flange 32, which fits inside the crimped rim 16, is formed as single piece with the insulating ring 31. The ring flange 32 also serves to fit the elastomer cylinder 3 in a fixed position with respect to the batteries 10. The insulating ring 31 insulates the crimped rim 16, and prevents the crimped rim 18 from touching and short circuiting with the connecting piece 20 and the bottom of the external case 11. Specifically, the insulating ring 31 holds the connecting piece 20 in a fixed position while preventing the two adjacent batteries 10 from short circuiting. In the elastomer cylinder 3 of FIG. 12, the inside surface of the insulating ring 31 contacts the surface 25 formed by the level difference between the inner region 23 and outer region 24 of the connecting piece 20, and retains the connecting piece 20 in a fixed position.

Further, in the elastomer cylinder 3 of FIG. 9, the insulating ring 31 is provided with a stopper piece 3B, which projects inside the region above the through holes 33. Although the stopper piece 36 shown in the figure is a projecting ridge, it may also be local projection pieces. The stopper piece 38 holds the connecting piece 20 in a manner that is difficult to release. The interior of the elastomer cylinder 3 at through holes 33 has a shape essentially equivalent to the outline of the connecting piece 20, and the interior shape of the stopper piece 36 is smaller than the outline of the connecting piece 20. In an elastomer cylinder 3 with this configuration, interior regions of through holes 33 provided in the insulating ring 31 are at the outer perimeter of the connecting piece 20, and the stopper piece 36 holds the connecting piece 20 in a manner that is difficult to release while preventing it from shifting out of place. With the stopper piece 36 holding the outside perimeter of the connecting piece 20 in place, welding projections 22 jutting from the bottom of the connecting piece 20 are put in contact with the sealing plate 12.

In the elastomer cylinder 3 of FIG. 13, the insulating ring 41 for insulating the crimped rim 16 is formed as a separate piece. This insulating ring 41 is not formed from elastomer, but rather is formed from hard or semi-hard synthetic resin, which deforms less than elastomer. A ring flange 42 is provided on the inside edge of the insulating ring 41. This insulating ring 41 is disposed between the crimped rim 18 and the outer region 24 of the connecting piece 20, and provides insulation between the crimped rim 16 and the connecting piece 20. the insulating ring 41 has an outside diameter essentially equal to the outside diameter of the battery 10, is held in place by the elastomer cylinder 3, has its ring flange 42 fit inside the crimped rim 16, and is also held in position without shifting via the crimped rim 16.

The elastomer cylinder 3 of FIG. 13 is provided with a retainer piece 35 to hold the connecting piece 20 in a fixed position in a manner that is difficult to release. The retainer piece 35 is disposed between the first and second cylindrical regions 37, 38, and is provided with through holes 33 for welding both sides of the connecting piece 20 to the ends of opposing batteries. Since the insulating ring Is not formed as a single piece with this elastomer cylinder 3, through holes 33 are made large and the width of the retainer piece 35 is made narrow. Large through holes 33 expose the outer region 24 of the connecting piece 20, which is disposed above the crimped rim 16, to the bottom of the external case 11, which is disposed above In the figure. The retainer piece 35 is positioned on top of the outside perimeter of the connecting piece 20, and holds the connecting piece 20 in a fixed position in a manner that is difficult to release. The outside diameter of the connecting piece 20 is essentially equal to the outside diameter of the battery 10. The connecting piece 20 contacts the Inside surfaces of the first and second cylindrical regions 37, 38, and Is prevented from shifting in the horizontal direction. Finally, since a surface 25 is formed by the level difference between the inner region 23 and outer region 24 of the connecting piece 20, this level-shift surface 25 contacts the inside surface of the insulating ring 41 to dispose the connecting piece 20 in a fixed position.

The thickness of elastomer cylinders 3 determines the width of cooling gaps 6. This is because elastomer cylinders 3 establish the cooling gaps 6 between battery regions 5 and holding compartments 4. Consequently, elastomer cylinders 3 are a thickness that establishes cooling gaps 6, which allow efficient cooling of battery modules 1 by ventilation with cooling air between battery regions 5 and holding compartments 4. For example, elastomer cylinder 3 thickness is made thicker than 2 mm and thinner than 8 mm. If thickness is less than 2 mm, sufficient cooling air cannot flow through the cooling gaps 6. If thickness is greater than 6 mm, the external size of the holder case 2 becomes too large.

The elastomer cylinders 3 shown in FIGS. 9, 12, and 13 are provided with ridges 30 in outside perimeter surfaces. The elastomer cylinders 3 of these and other figures are provided with rings of accordion-like ridges 30. The surface of this type of elastomer cylinder 3 is easy to deform and achieves the characteristic that battery modules 1 can be firmly sandwiched between Inside surfaces of holding compartments 4 and reliably held.

Elastomer cylinder 3 and battery 10 surfaces of battery modules 1, that is entire battery modules 1, are covered with external laminate such as heat-shrink tubing (not illustrated). The elastomer cylinders 3 and batteries 10 of a battery modules 1 can be protected via the external laminate. Further, insulating film can be used for the external laminate, and battery 10 surfaces can be insulated.

Figure 5:
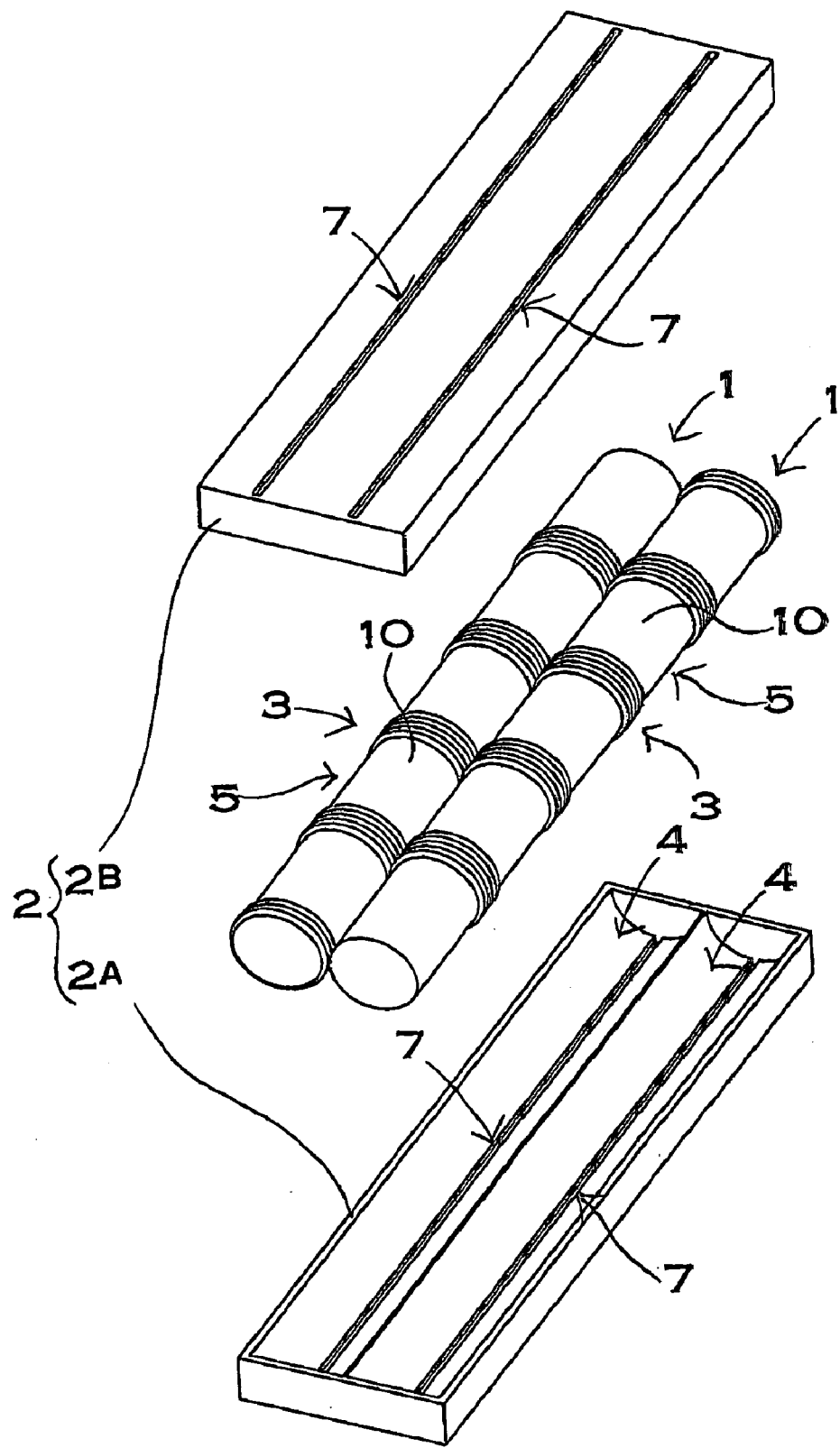
FIG. 5 is an exploded oblique view of the battery apparatus shown In FIG. 4.
Figure 6:
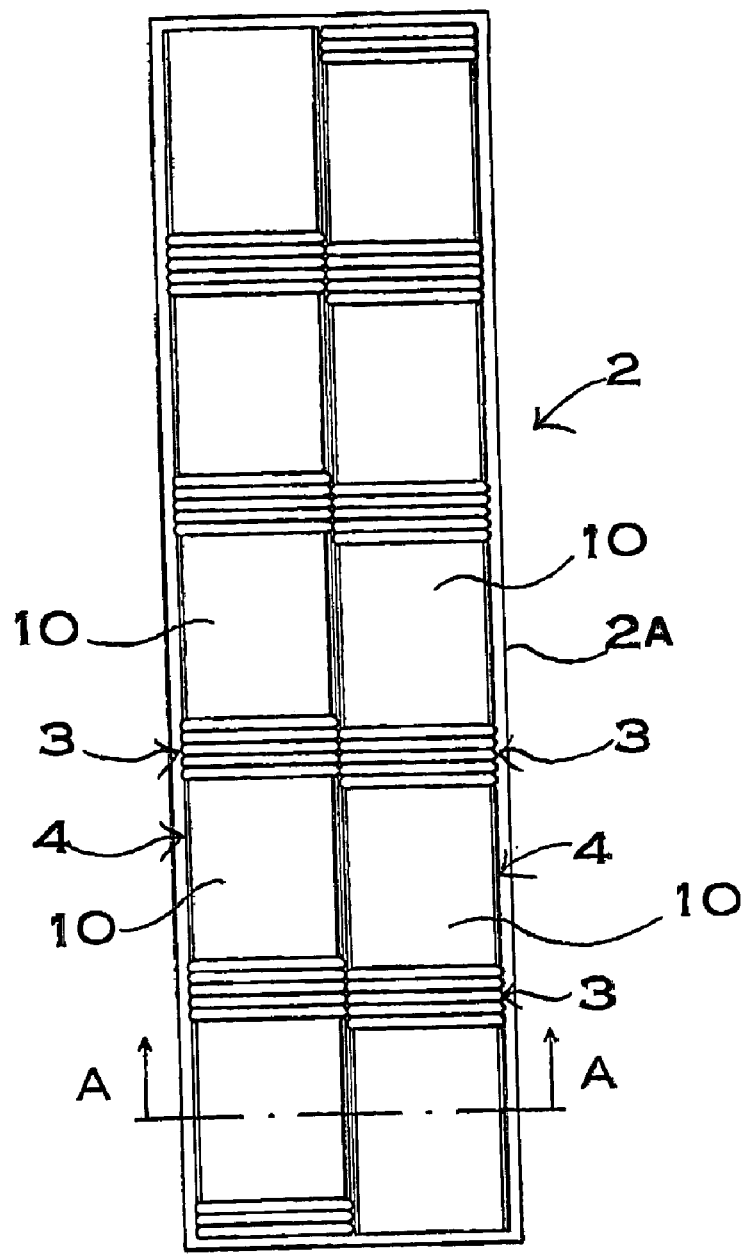
FIG. 6 is a plan view showing the internal structure of the battery apparatus shown in FIG. 4.
Figure 7:
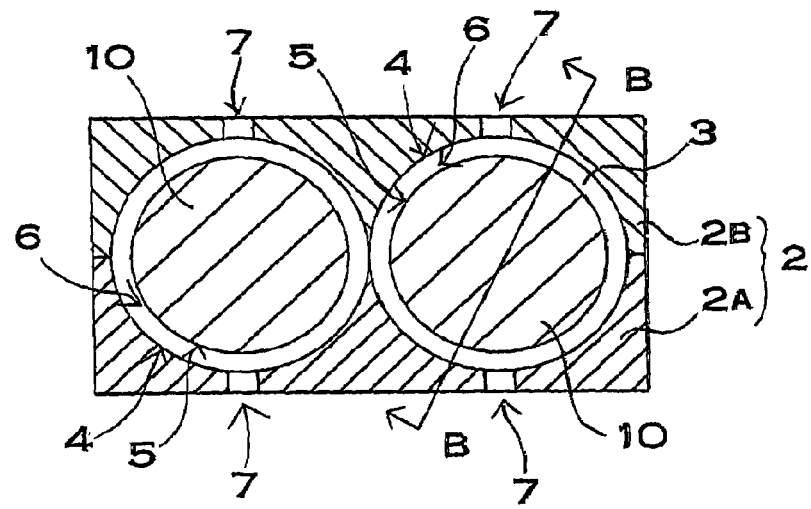
FIG. 7 is a lateral cross-section view of the battery apparatus shown in FIG. 4, and is a cross-section through the line A-A of FIG. 6.
Figure 8:
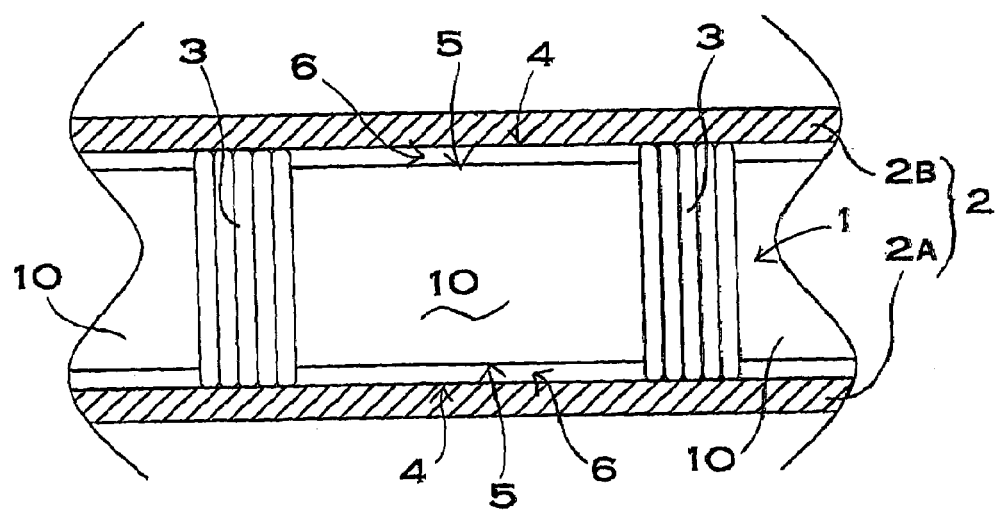
FIG. 8 is a cross-section view through the line B-B of the battery apparatus shown in FIG. 7.

The holder case 2 is provided with holding compartments 4 formed from plastic, which house battery modules 1 in parallel disposition. As shown in FIG. 5, the holder case 2 is divided into a first holder 2A and a second holder 2B to sandwich and hold battery modules 1 in holding compartments 4. The shape of the interior of a holding compartment 4 formed by the first and second holders 2A, 2B is cylindrical, narrower than the outline of elastomer cylinders 3, and wider than the outline of battery regions 5 between elastomer cylinders 3. In this battery apparatus, since battery modules 1 have circular cylindrical batteries connected in a straight-line fashion, holding compartments 4 are shaped as circular cylinders. A holder case for housing battery modules made by connecting rectangular batteries has holding compartments that shaped as rectangular cylinders.

The holder case 2 is provided with cooling orifices 7 for cooling battery modules 1 held in holding compartments 4. The holder case 2 of the figures is provided with slit shaped cooling orifices 7 in the first and second holders 2A, 2B. In this holder case 2, cooling air is supplied to a holding compartment 4 through cooling orifices 7 on one side and Is exhausted from cooling orifices 7 on the other side to cool a battery module 1. Cooling air supplied through cooling orifices 7 passes through cooling gaps 6 established between holding compartment 4 inside surfaces and battery regions 5 due to elastomer cylinders 3 to cool the battery module 1.

In the holder case 2, battery modules 1 are disposed in holding compartments 4, the first and second holders 2A, 2B are joined together, and elastomer cylinder regions are resiliently compressed by inside surfaces of holding compartments 4 to hold battery modules 1 inside holding compartments 4. As shown in the cross-section views of FIGS. 7 and 8, cooling gaps 6 are established inside this configuration of holder case 2 between the surfaces of battery regions 5 and inside surfaces of holding compartments 4. Cooling air is introduced to those cooling gaps 6, and the battery modules 1 are cooled. As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims. This application is based on application No. 2004-214928 filed in Japan on Jul. 22, 2004, the content of which is incorporated hereinto by reference.

What is claimed is:

1. A car power source battery apparatus comprising:
    battery modules provided with a plurality of batteries joined in a straight-line fashion, the battery modules being batteries connected in series and joined in a straight-line fashion either with or without intervention of connecting pieces;
    a holder case to house the battery modules;
    wherein battery modules further comprise elastomer cylinders which are cylindrical elements that can flexibly deform and cover boundary regions between connected batteries;
    wherein an elastomer cylinder is layered on top of both end region surfaces of adjacent batteries, and the center region covers the connection gap at the boundary between batteries;
    wherein a battery module provided with the elastomer cylinders at connection regions has an outline at the elastomer cylinder regions that is wider than the outline of battery regions, which are not covered by the elastomer cylinder;
    wherein the holder case has holding compartments to house battery modules, the holder case is divided into a first holder and a second holder to sandwich and hold battery modules in those holding compartments, the inside shape of holding compartments formed by the first holder and the second holder is a cylinder shape narrower than the outline at elastomer cylinder regions, and wider than the outline of battery regions; and wherein battery modules are disposed in cylinder shaped holding compartments the first holder and the second holder are joined together, elastomer cylinder regions are resiliently compressed by inside surfaces of holding compartments to retain battery modules in the holding compartments, and cooling gaps are established between battery regions and inside surfaces of the holding compartments.

2. A car power source battery apparatus as recited in claim 1 wherein batteries are circular cylindrical batteries, holding compartments have circular cylindrical shapes, the inside diameter of holding compartments is smaller than the outside diameter of the elastomer cylinder regions, and the inside diameter of holding compartments is larger than the outside diameter of battery regions.

3. A car power source battery apparatus as recited in claim 1 wherein the elastomer cylinder is polymer material that displays rubber-like flexibility at room temperature, and is either urethane, silicone, synthetic rubber, or soft synthetic resin.

4. A car power source battery apparatus as recited in claim 1 wherein the elastomer cylinder is provided with alignment projections that project from its inside surface and can insert into the perimeter groove of a battery end region, these alignment projections insert into the perimeter groove of a battery end region and make it difficult for the elastomer cylinder to come off the battery.

5. A car power source battery apparatus as recited in claim 4 wherein the alignment projections are a projecting ridge.

6. A car power source battery apparatus as recited in claim 1 wherein the elastomer cylinder is provided with an insulating ring formed as a single piece with the elastomer cylinder to hold the connecting piece in a fixed position and insulate it from the crimped rim.

7. A car power source battery apparatus as recited in claim 6 wherein the elastomer cylinder covers crimped rim surfaces including its inside surface with the insulating ring, and is provided with a ring flange formed as a single piece, which fits inside the crimped rim to insulate the inside surface of the crimped rim.

8. A car power source battery apparatus as recited in claim 1 wherein the elastomer cylinder is provided with a stopper piece that holds the connecting piece in a manner that is difficult to release.

9. A car power source battery apparatus as recited in claim 1 wherein an insulating ring for insulating the crimped rim is formed as a separate piece from the elastomer cylinder and is formed from hard or semi-hard synthetic resin.

10. A car power source battery apparatus as recited in claim 1 wherein the thickness of an elastomer cylinder thicker than 2 mm and thinner than 8 mm.

11. A car power source battery apparatus as recited in claim 1 wherein surfaces of elastomer cylinders and batteries are covered by an external laminate.

12. A car power source battery apparatus as recited in claim 1 wherein the holder case is provided with cooling orifices connected with cooling gaps, and battery modules are cooled by forced ventilation from those cooling orifices through the cooling gaps.

13. A car power source battery apparatus as recited in claim 12 wherein the cooling orifices are slits.

14. A car power source battery apparatus as recited in claim 1 wherein ridges are provided on the surfaces of elastomer cylinders.

15. A car power source battery apparatus as recited in claim 1 wherein the elastomer cylinders are provided with rings of accordion-like ridges.

* * * * *